No. 876,832. PATENTED JAN. 14, 1908.
F. L. ORR.
GAS ENGINE COOLER.
APPLICATION FILED APR. 10, 1907.
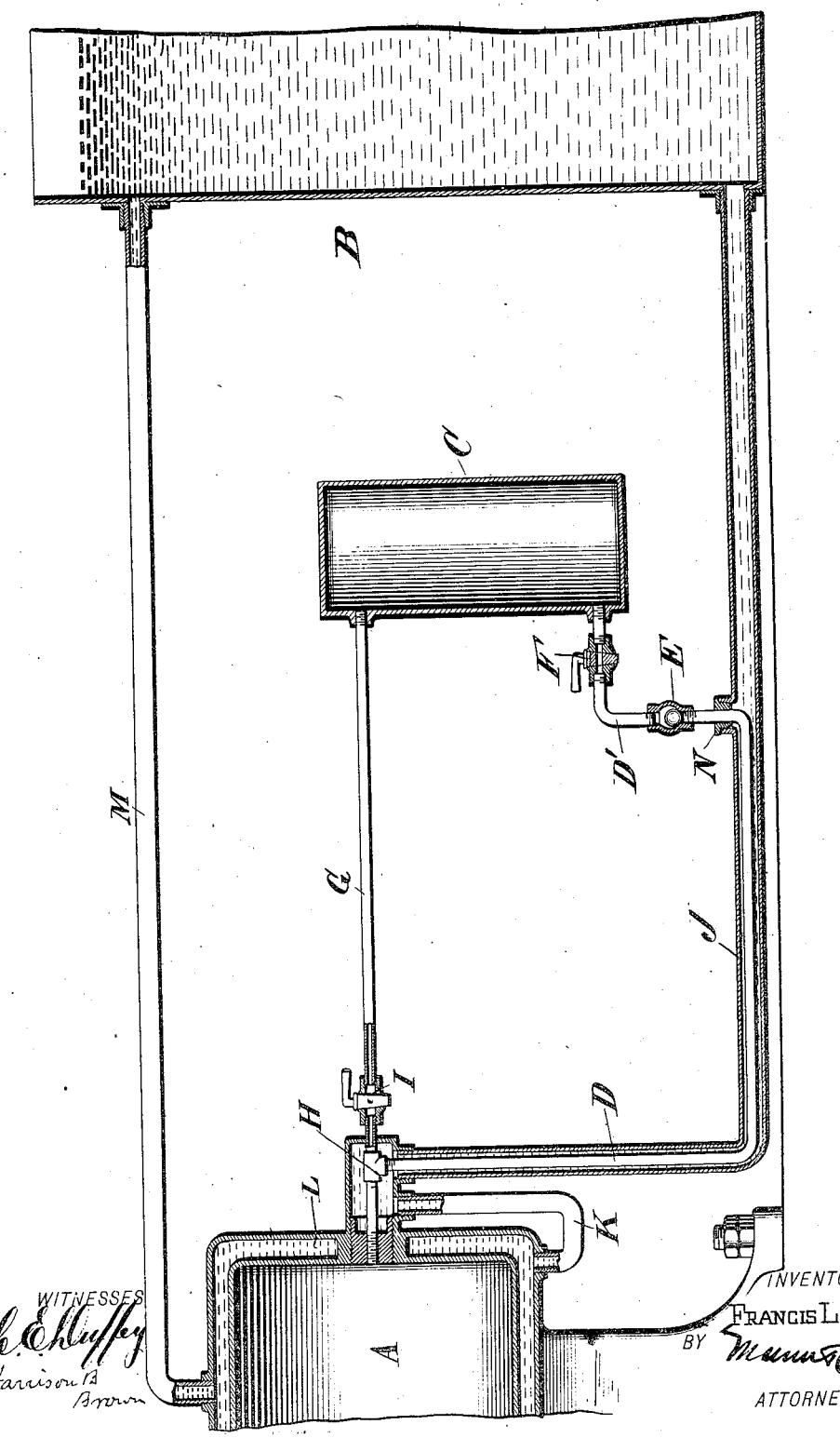
INVENTOR
FRANCIS L. ORR
BY
ATTORNEYS

UNITED STATES PATENT OFFICE.

FRANCIS LEONARD ORR, OF THURMAN, IOWA.

GAS-ENGINE COOLER.

No. 876,832.　　　Specification of Letters Patent.　　Patented Jan. 14, 1908.

Application filed April 10, 1907. Serial No. 367,346.

*To all whom it may concern:*

Be it known that I, FRANCIS LEONARD ORR, a citizen of the United States, and resident of Thurman, in the county of Fremont and State of Iowa, have invented an Improved Gas-Engine Cooler, of which the following is a specification.

This invention is designed as an improvement on an engine starter for which Letters Patent No. 837,953, were granted to me, December 11, 1906.

In my Letters Patent aforesaid, I illustrate and describe means adapted to store expanded gases in a storage tank, and means whereby pressure of the stored gas, may be employed to boost, or start the engine in action.

In the form of engine starter above referred to, I employed two passageways extending from the combustion end of an internal combustion engine to a tank adapted to hold gas under pressure. Now I have discovered that the hot expanded gases conveyed into the storage tank aforesaid, remain at such high temperature that when used as boosting force in starting the engine, the passageway at its engine-end becomes unduly hot, causing preignition of the engine charge, an operation or effect likely to damage the engine, or occasion danger well understood and desirable to be avoided.

This invention is mainly designed as a cooling attachment to the form of engine starter fully described in the Patent No. 837,953, but is equally adapted for use with other forms of engine starters employing expanded or stored hot gases as the boosting motive power, and therefore I do not confine myself in its use to any particular form of explosive or hot-air engine.

The accompanying drawing illustrates my invention by sectional view showing one embodiment thereof in operative connection with the power cylinder of a gas engine. The fragmentary portion of power-cylinder shown by the view is chiefly diagrammatic of the combustion end of the cylinder, and the other features shown may also be stated as being in diagram, since they may be modified in arrangement, and automatically operated valves employed for control of gas flowing through the hot air passageways.

In the drawing, A designates a fragmentary portion of a gas engine, more definitely stated, the combustion end of the engine cylinder.

B designates a water tank, and C a tank adapted to hold hot gases under pressure.

My perfected invention comprehends the use of a pipe D extending from the expansion chamber of the engine cylinder A, having a check-valve E therein, adapted for automatic closure of passageway therethrough, leading from the storage tank. In other words, free flow of expanded gases is thereby permitted passageway through the pipe D from the cylinder A to and into the tank C, but thereby checked against back flow through the pipe D. In the pipe D, I locate a cut-off valve F, shown as an ordinary plug-valve, but obviously any other form of valve may be substituted therefor.

G designates a pipe which may be arranged extending from a location H in the pipe D, adjacent to the engine-cylinder A, as shown, and with said pipe extended to the tank C, thereby providing passageway from the cylinder A to and into the tank C. In the pipe G, I provide a controller valve I shown as a simple turning-plug, but obviously, said valve I may be of any other suitable form, as for instance, similar to the valve D illustrated and described in my Letters Patent No. 837,953, hereinbefore referred to.

The pipes D and G constitute connecting passageways between the cylinder A and tank C for the conveyance of exhaust or hot expanded gases from one to the other thereof.

Pressure of gas stored in the tank C is designed to be employed as motive or boosting power, to start the engine in operation, and it will be understood that during operation of the engine-piston, not shown, that exhaust from the cylinder A will flow through the pipe D, opening the check valve E, and thence pass into the tank C, but obviously the valve F should be adjusted adapted for the purpose.

The valve I should be at closing adjustment while the tank is being stored. Now assuming that the engine is at rest, and it is desired to start it in operation, obviously when the valve I is adjusted to open position, pressure of gas will flow through the pipe G, conveying motive power into the engine cylinder A, with pressure designed to start the engine in operation, as well understood, and one embodiment thereof being fully described in my Letters Patent aforesaid. The above statement in connection with the following description of the essential, or detail features of my cooling means, will render the invention fully understood. Now it is apparent that the hot gases forced into the storage tank C, will heat the pipe D at its engine-end, to such degree of temperature, that preignition of the engine charge would result, and the liability thereof is a fact of actual experience with the form of starter covered by my Patent No. 837,953.
Referring now to the figure of drawing, J designates a pipe providing open passageway, leading through a branch pipe K from the water-tank B to and into a water-jacket L on the engine cylinder A, and M is a return water-pipe leading from the cylinder jacket L to and into the water-tank B.

In the practice of my invention, the hot gas conveying pipe D is arranged in the water-pipe J, thereby providing it with a water-jacket from its connection with the engine cylinder to a location in the said pipe J, sufficiently remote from said cylinder to effectively cool its exhaust flowing through the pipe D into the storage-tank.
In the drawing the pipe D is shown extending through a stuffing-box N, with its outside portion D' adapted for location therein of the valves F, E.

It is apparent that during operation of the engine, water will flow from the tank B, through the pipe J, the branch pipe K, and thence into the water space around the engine cylinder A. Continued circulation of the cooling water will flow from the cylinder water-space, through the pipe M, and back into the water tank B, and with continued cycle of flow during operation of the engine.

I claim:
1. The combination with a gas engine, of a storage-tank, a series of gas passageways providing communication between the engine and storage-tank, valves in said passageways, a water-tank, and passageways providing circulation between said water-tank and the engine jacket, a gas passageway in the series thereof being arranged within the water circulating passageway.

2. The combination with an internal combustion engine employing a cylinder having a water-jacket, of a water-tank, a series of water conveying pipes between the said tank and the jacket, a storage-tank, a series of gas conveying pipes between the tank and the engine cylinder, one of the series being inclosed for a part of its length in one of the water pipes, and valves in the gas pipes controlling the passages therethrough.

3. The combination in a gas-engine starter, comprising a storage-tank, gas exhaust and supply conveying pipes providing storing and starting means between the engine and storage-tank, and controller valves in said pipes, of cooling means comprising a water-tank, and circulating passageways connecting the engine jacket with said water-tank, the gas exhaust or storing pipe being arranged within the water-circulating passageways, adapted to be cooled by water circulating between the engine and water-tank.

FRANCIS LEONARD ORR.

Witnesses:
BERT LE BRON,
W. T. WALKER.